US012690621B2

(12) United States Patent
Wu et al.

(10) Patent No.: US 12,690,621 B2
(45) Date of Patent: Jul. 28, 2026

(54) METHOD FOR CONTROLLING ELECTRONIC CIGARETTE, AND ELECTRONIC CIGARETTE

(71) Applicant: SHENZHEN FIRST UNION TECHNOLOGY CO., LTD., Shenzhen (CN)

(72) Inventors: Huidong Wu, Shenzhen (CN); Zhongli Xu, Shenzhen (CN); Yonghai Li, Shenzhen (CN)

(73) Assignee: SHENZHEN FIRST UNION TECHNOLOGY CO., LTD., Shenzhen (CN)

( * ) Notice: Subject to any disclaimer, the term of this patent is extended or adjusted under 35 U.S.C. 154(b) by 637 days.

(21) Appl. No.: 17/617,022

(22) PCT Filed: May 28, 2020

(86) PCT No.: PCT/CN2020/092962
§ 371 (c)(1),
(2) Date: Dec. 7, 2021

(87) PCT Pub. No.: WO2020/248826
PCT Pub. Date: Dec. 17, 2020

(65) Prior Publication Data
US 2022/0338551 A1      Oct. 27, 2022

(30) Foreign Application Priority Data
Jun. 11, 2019    (CN) .......................... 201910499997.2

(51) Int. Cl.
*A24F 40/51*      (2020.01)
*A24F 40/53*      (2020.01)
(Continued)

(52) U.S. Cl.
CPC .............. *A24F 40/51* (2020.01); *A24F 40/53* (2020.01); *G01F 25/10* (2022.01); *A24F 40/10* (2020.01)

(58) Field of Classification Search
CPC ....................................................... A24F 40/51
See application file for complete search history.

(56) References Cited

U.S. PATENT DOCUMENTS

2009/0260428  A1*  10/2009  Yamashita .............. G01F 25/15
                                              73/114.31
2014/0096782  A1    4/2014  Ampolini et al.
                           (Continued)

FOREIGN PATENT DOCUMENTS

CN        104055227  A      9/2014
CN        104921305  A      9/2015
                           (Continued)

*Primary Examiner* — Hyun D Park
(74) *Attorney, Agent, or Firm* — PROI Intellectual Property US

(57)              ABSTRACT

The present disclosure provides a method for controlling an electronic cigarette and an electronic cigarette. The electronic cigarette comprises an airflow sensor. The control method comprises: measuring whether a duration of a low-level signal sent by the airflow sensor is greater than a preset threshold; if so, when a high-level signal sent by the airflow sensor is received, responding to the high-level signal so as to control the electronic cigarette to operate; and if not, when a high-level signal sent by the airflow sensor is received, not responding to the high-level signal. In the above control method, it is determined, according to the duration of the low-level signal generated by the airflow sensor, whether to respond to triggering of the high-level signal so as to cause the electronic cigarette to operate.

14 Claims, 4 Drawing Sheets

(51) Int. Cl.
     *G01F 25/10*        (2022.01)
     *A24F 40/10*        (2020.01)

(56)                    References Cited

U.S. PATENT DOCUMENTS

| | | | | |
|---|---|---|---|---|
| 2014/0150810 A1* | 6/2014 | Hon | A24F 40/51 | |
| | | | | 131/329 |
| 2015/0305410 A1* | 10/2015 | Liu | A24F 40/51 | |
| | | | | 131/329 |
| 2015/0374040 A1* | 12/2015 | Chen | G01R 31/66 | |
| | | | | 131/328 |
| 2017/0035118 A1 | 2/2017 | Liu | | |
| 2017/0079329 A1* | 3/2017 | Zitzke | H05B 1/0225 | |
| 2017/0325289 A1 | 11/2017 | Liu | | |
| 2018/0184711 A1* | 7/2018 | Dickens | A24F 40/51 | |
| 2019/0124989 A1* | 5/2019 | Qiu | H05B 1/0244 | |
| 2019/0247598 A1* | 8/2019 | Yamada | A61M 15/0065 | |

FOREIGN PATENT DOCUMENTS

| | | | |
|---|---|---|---|
| CN | 106037023 A | 10/2016 |
| CN | 107467718 A | 12/2017 |
| CN | 109730361 A | 5/2019 |
| CN | 109832677 A | 6/2019 |
| CN | 110179163 A | 8/2019 |
| EP | 2959787 A1 | 12/2015 |
| WO | 2014066730 A1 | 5/2014 |
| WO | 2015157894 A1 | 10/2015 |
| WO | 2016101248 A1 | 6/2016 |
| WO | 2016154815 A1 | 10/2016 |
| WO | 2018032951 A1 | 2/2018 |

\* cited by examiner

METHOD FOR CONTROLLING ELECTRONIC CIGARETTE, AND ELECTRONIC CIGARETTE

CROSS REFERENCE TO RELATED APPLICATION(S)

This application claims priority to Chinese Patent Application entitled "Method for controlling electronic cigarette, and electronic cigarette" with application number of 201910499997.2, submitted to China National Intellectual Property Administration on Jun. 11, 2019, the entire contents of which are incorporated herein by reference.

TECHNICAL FIELD

The present disclosure relates to the technical field of electronic cigarettes, and in particular to a method for controlling an electronic cigarette, and electronic cigarette.

BACKGROUND

At present, most electronic cigarette products that use e-liquids sense user's smoking actions employing a microphone and then generate an air pressure change signal so as to trigger the electronic cigarette to operate. For this kind of electronic cigarette products, an atomization assembly is employed to absorb an e-liquid to atomize from a liquid storage chamber and generates an aerosol for inhalation, then the aerosol is output to be inhaled by a user as the inhaling airflow flows. The atomization assembly generally employs cotton, porous ceramic, capillary glass fiber tube and the like to absorb and conduct the e-liquid. However, when the cotton, porous ceramic, capillary glass fiber tube and the like have the absorbed e-liquid reached a certain load, they will leak the e-liquid to the adjoining gas channel, even to the microphone, thereby causing the microphone to generate a triggering signal under the pressure of the e-liquid; however, the controller does not determine and identify the source of the sense signal of the microphone, and controls the electronic cigarette to operate under the sense signal of the microphone, which will result in dry burning of the atomization assembly.

SUMMARY

In order to solve the problem in existing technology that the airflow sensor is false triggered by a leaking e-liquid, the embodiment of the present disclosure provides a method for controlling an electronic cigarette and an electronic cigarette which can avoid the occurrence that the airflow sensor of the electronic cigarette still controls the electronic cigarette to operate when false triggered by a leaking e-liquid.

The embodiment of the present disclosure provides a method for controlling an electronic cigarette, the electronic cigarette including an airflow sensor, wherein the method includes the following steps:

measuring whether a duration of a low-level signal sent by the airflow sensor is greater than a preset threshold; if so, when a high-level signal sent by the airflow sensor is received, responding to the high-level signal so as to control the electronic cigarette to operate; and if not, when a high-level signal sent by the airflow sensor is received, not responding to the high-level signal.

Preferably, the method further includes the following steps:

setting a state flag configured for marking whether the airflow sensor is in a normal state or an abnormal state; when a high-level signal sent by the airflow sensor is received, detecting whether the state flag marks a normal state; if the state flag marks a normal state, responding to the high-level signal so as to control the electronic cigarette to operate; if the state flag does not mark a normal state, not responding to the high-level signal.

Preferably, the method further includes the following steps: measuring whether a duration of a low-level signal sent by the airflow sensor is greater than a preset threshold; if so, adjusting the state flag to mark a normal state; if not, adjusting the state flag to mark an abnormal state.

Preferably, the step of setting a state flag configured for marking whether the airflow sensor is in a normal state or an abnormal state includes:

marking an initial state of the state flag as a normal state.

Preferably, the electronic cigarette further includes a controller having a flag register, and the state flag is stored in the flag register of the controller.

Preferably, a signal sent by the airflow sensor includes a first high-level signal and a second high-level signal that are adjacent; the duration of the low-level signal is a time interval between the first high-level signal and the second high-level signal.

Preferably, the preset threshold is greater than or equal to 200 ms.

Preferably, the preset threshold is less than 1 s.

Preferably, the method further includes the following steps:

setting a state flag configured for marking whether the airflow sensor is in a normal state or an abnormal state; when a high-level signal sent by the airflow sensor is received, detecting whether the state flag marks a normal state; if the state flag marks a normal state, responding to the high-level signal so as to control the electronic cigarette to operate; if the state flag does not mark a normal state, not responding to the high-level signal.

Preferably, the method further includes the following steps:

measuring whether a duration of a high-level signal sent by the airflow sensor is greater than a preset threshold; if so, adjusting the state flag to mark a normal state; if not, adjusting the state flag to mark an abnormal state.

Preferably, the method further includes the following steps:

detecting whether a frequency of low-level and/or high-level signals sent by the airflow sensor per unit time is greater than a preset threshold; if so, adjusting the state flag to mark an abnormal state; if not, adjusting the state flag to mark a normal state.

The embodiment of the present disclosure also provides an electronic cigarette, including an airflow sensor and a controller, wherein the controller includes a processing unit, which is configured for executing the above method for controlling the electronic cigarette.

The embodiment of the present disclosure also provides a nonvolatile computer readable storage medium, which stores computer executable instructions that, when executed by the electronic cigarette, cause the electronic cigarette to execute the above method for controlling the electronic cigarette.

The embodiment of the present disclosure also provides a computer program product, which includes a computer program stored on a nonvolatile computer readable storage medium, wherein the computer program includes program instructions which, when executed by the electronic cigarette, cause the electronic cigarette to execute the above method for controlling the electronic cigarette.

In the above control method, it is determined, according to the duration of the low-level signal generated by the airflow sensor, whether to respond to triggering of the high-level signal so as to cause the electronic cigarette to operate. If the duration of the low-level signal is too short, it is determined that the airflow sensor has been falsely triggered by a leaking e-liquid. Therefore, only when the detected low level time length is greater than certain duration, a control signal is output to control the electronic cigarette to operate, thus avoiding the issue of dry burning when the airflow sensor is false triggered by the leaking e-liquid but still controls the electronic cigarette to operate.

BRIEF DESCRIPTION OF THE DRAWINGS

One or more embodiments are illustrated through the image(s) in corresponding drawing(s). These illustrations do not form restrictions to the embodiments. Elements in the drawings with a same reference number are expressed as similar elements, and the images in the drawings do not form proportion restrictions unless otherwise stated.

DETAILED DESCRIPTION

For a better understanding of the present disclosure, a detailed description is provided below for the present disclosure in conjunction with accompanying drawings and specific embodiments.

Figure 1:
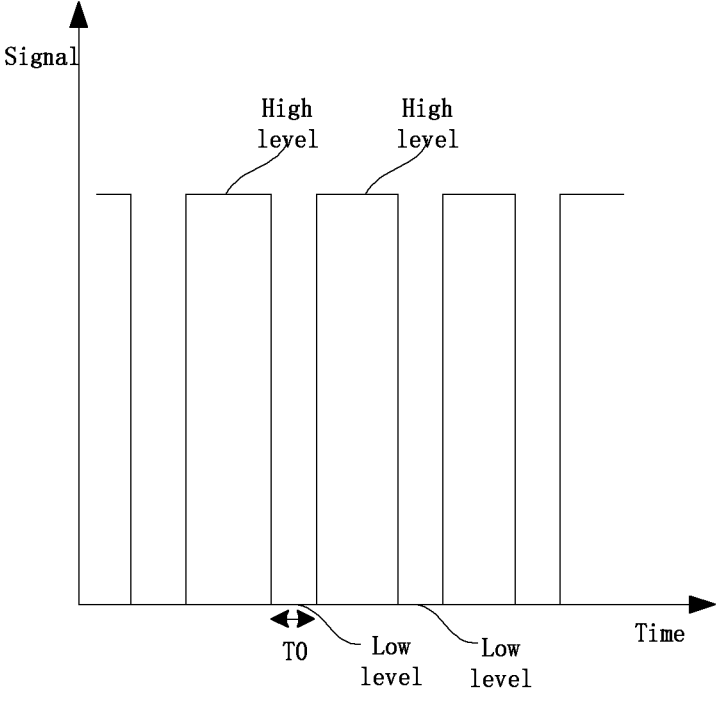
FIG. 1 is a diagram of a level signal of an airflow sensor triggered by a leaking e-liquid in one embodiment.
Figure 2:
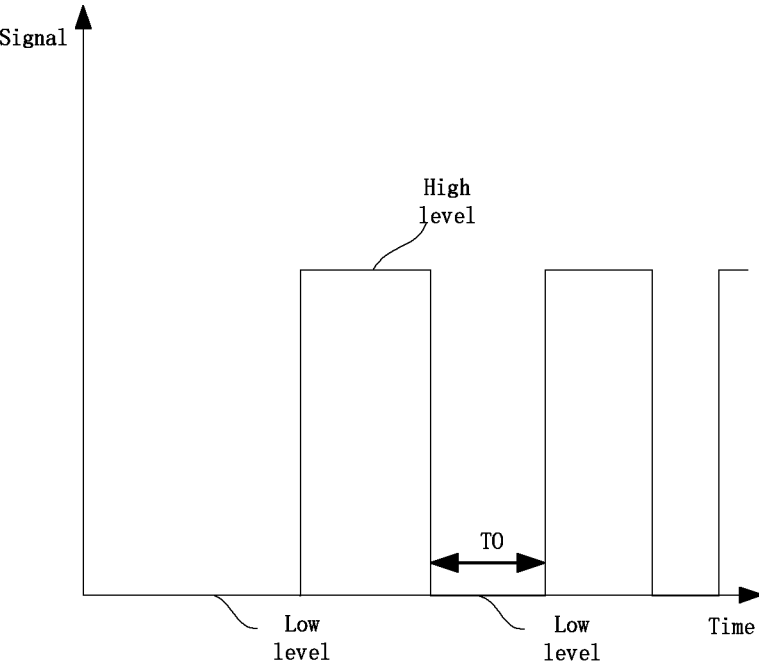
FIG. 2 is a diagram of a level signal of an airflow sensor triggered by a user's smoking action in one embodiment.
Figure 3:
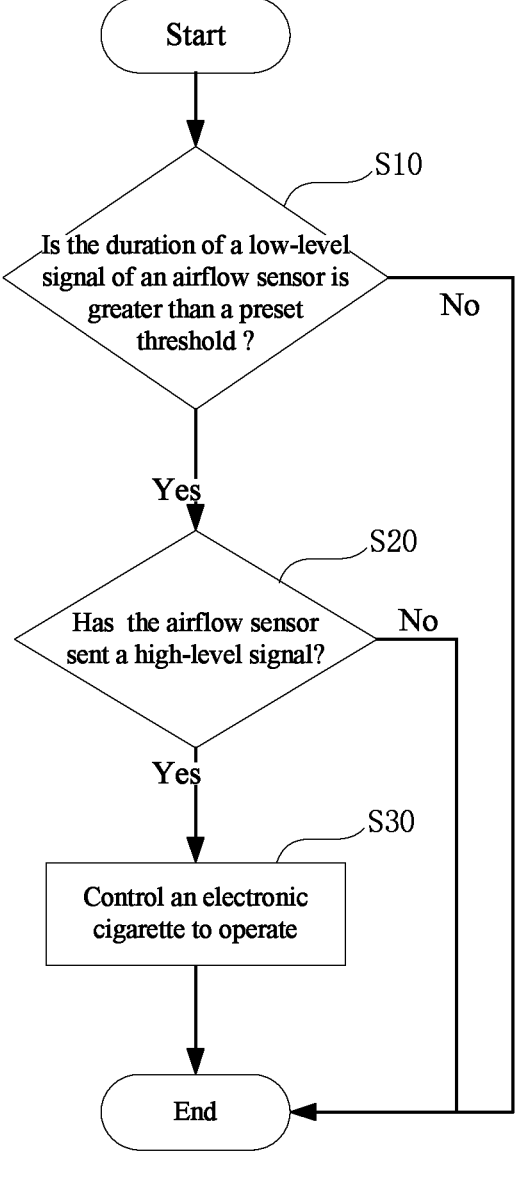
FIG. 3 is a flowchart of a method for controlling an electronic cigarette in one embodiment.
Figure 4:
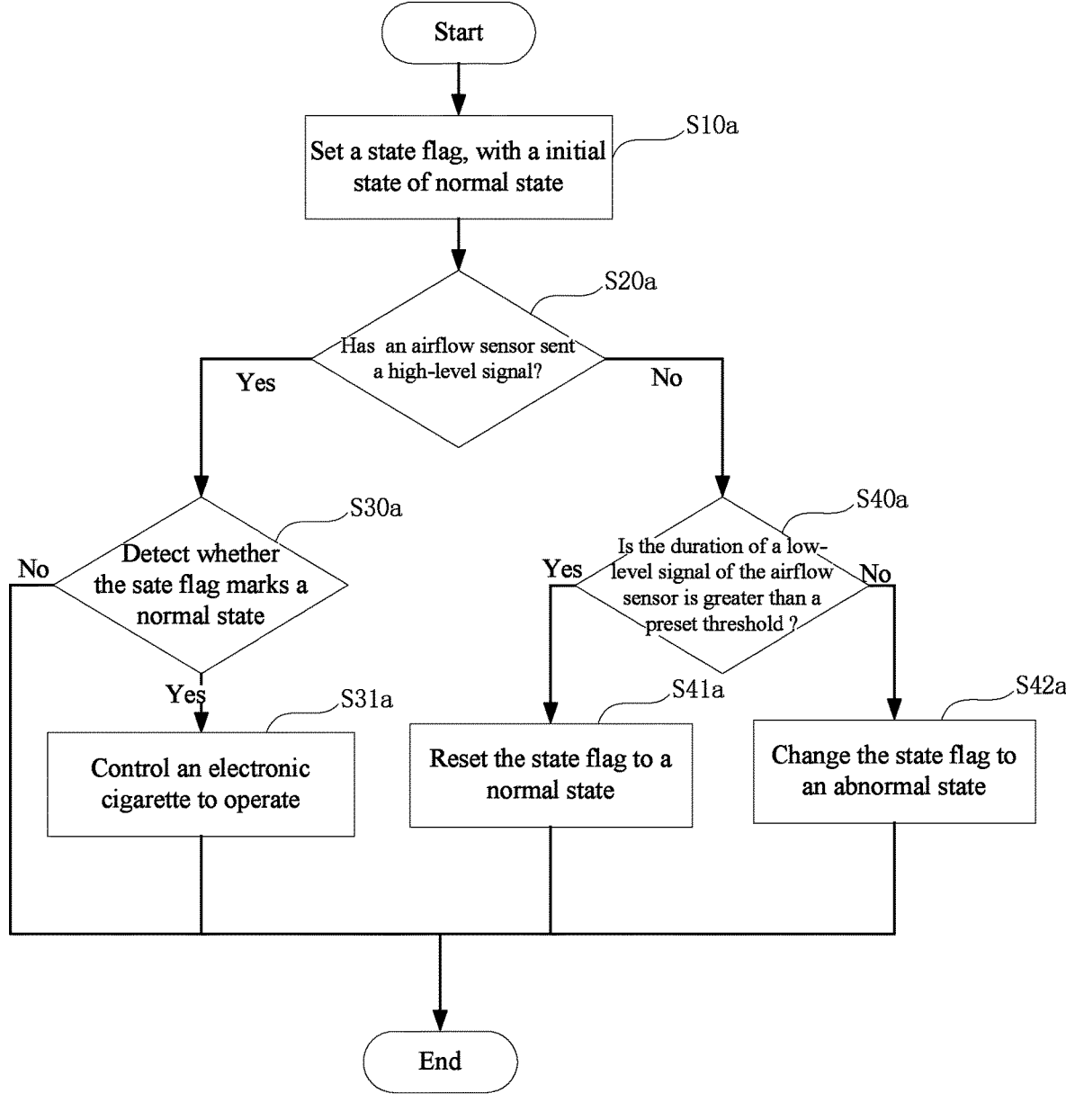
FIG. 4 is a flowchart of a method for controlling an electronic cigarette in one preferred embodiment.

An embodiment of the present disclosure provides a method for controlling an electronic cigarette, which judges a signal of an airflow sensor trigged by different triggering sources and controls the electronic cigarette to operate according to the judgment result. Specifically, according to the reasons of triggering an airflow sensor in actual use, the triggering condition in the embodiment of the present disclosure includes e-liquid leaking triggering and normal smoking triggering, under which the signals triggered by the airflow sensor have a waveform graph shown in FIG. 1 and FIG. 2 respectively. The airflow sensor can output the waveforms shown in FIG. 1 and FIG. 2 based on the internal structure; generally, the airflow sensor includes a capacitance sensing part and a signal sampling output part, wherein the capacitance sensing part has a capacitance change due to a leaking e-liquid or a smoking airflow, and the signal sampling output part collects the capacitance change of the capacitance sensing part based on a frequency/time; when a capacitance change is detected at the capacitance sensing part within a sampling time, a high-level signal is output; when no capacitance change is detected at the capacitance sensing part within a sampling time, and a low-level signal is output in all the time intervals between the sampling actions, a waveform graph of alternation of high level and low level as shown in FIG. 1 and FIG. 2 is formed. Of course, the signal sampling output parts of the airflow sensors manufactured by different factories have a slight difference in sampling frequency and time, however, when applied to the triggering control of electronic cigarettes, the signal sampling output parts of the airflow sensors from most factories have both the sampling frequency and time interval set within 100 ms.

To compare the contents shown in the signal graphs, FIG. 1 is a waveform graph of a signal triggered by an airflow sensor when an e-liquid leaks to the airflow sensor, the alternation of high-level and low-level signals generated by the airflow sensor has a high frequency, adjacent high-level/low-level signals have a time interval less than 200 ms; generally, the airflow sensors manufactured by different factories have a slight difference in low level interval, roughly ranged between 30 and 180 ms; moreover, the waveform of the signal presents a relative regular periodic change in time, for example, FIG. 1 shows a waveform signal of an airflow sensor manufactured from one factory triggered by an e-liquid, with a periodicity of 158.4 ms, an average high-level signal value of 2.76V, and a low-level interval of about 54.4 ms. FIG. 2 is a waveform graph of a signal triggered by an airflow sensor when a user smokes; the high-level signal generated by the airflow sensor has a relative long duration, generally about 1 s-4 s according to the smoking time length of the user; the low-level signal duration of the smoking interval is longer than in the condition of e-liquid leaking, and the alternation of high-level and low-level signals have a low frequency; furthermore, the waveform of the signal triggered by the airflow sensor when smoking is impacted by the length of the exhaling and inhaling time of the user, which will not have the periodicity of waveform shown in FIG. 1.

Therefore, according to the difference between the signals triggered by the airflow sensor in different triggering conditions shown in FIG. 1 and FIG. 2, one embodiment of the present disclosure provides a method for controlling an electronic cigarette, which includes the following steps:

S10: measuring whether a duration of a low-level signal sent by the airflow sensor is greater than a preset threshold; if so, executing S20; otherwise, not responding to it, and continuing to detect a next low-level signal.

S20: detecting whether a high-level signal sent by the airflow sensor is received; if yes, executing S30; if not, not responding to it, and continuing to detect a high-level signal.

S30: controlling the electronic cigarette to operate.

In the process of the control method described in the above embodiment, it is determined, according to the duration of the low-level signal generated by the airflow sensor, whether to respond to triggering of the high-level signal so as to cause the electronic cigarette to operate. If the duration of the low level is too short, it is determined that the airflow sensor has been false triggered by a leaking e-liquid. Therefore, only when the detected low level time is greater than certain duration, a control signal is output to control the electronic cigarette to operate, thus avoiding the issue of dry burning when the airflow sensor is false triggered by the leaking e-liquid but still controls the electronic cigarette to operate.

It is to be noted that, based on the waveform signal of the airflow sensor shown in FIG. 1 and FIG. 2, the duration of the low-level signal in the above S10 is calculated according to a time interval between a former high-level signal and a latter high-level signal. As shown in FIG. 1 and FIG. 2, a time interval between high-level signals is T0, a preset time threshold is T1, the program is executed according to the comparison result of T1 and T0.

In a preferred embodiment, according to the condition shown in FIG. 1 that the duration of the low-level signal in the signals triggered by the airflow sensor due to e-liquid leaking is lower than 200 ms, the preset threshold in S20 may be set to 200 ms or higher than 200 ms, which may basically cover the airflow sensors produced by different factories and ensure the accuracy of the detection result. Of course, when setting the preset threshold, further set it to be less than the low level duration 1 s-4 s of the smoking interval of the user shown in FIG. 2, so as to avoid the occurrence that the electronic cigarette does not operate when normal smoking because the threshold is set too high.

When controlling employing the above implementation, each time a high-level signal triggered by the airflow sensor is received, it is needed to complete the sampling and comparison computation of the former low-level signal duration, thus certain time is needed from the time of receiving the high-level triggered signal to the time of obtaining a result to control the electronic cigarette to operate, which results in a slightly long delay between the start time of operating of the electronic cigarette and the user's smoking action; since the high-level and low-level signals of the airflow sensor has an alternation, if the delay time caused by the computation of the low-level signal each time is longer than or equal to the time interval (the lowest is 1 s as described) of smoking, then when a next high-level signal is sent, the previous triggering does not cause a normal operation, which affects the smoking experience.

Therefore, based on the above condition, in one preferred embodiment of the present disclosure, a state flag is added in the control process which is configured for marking whether the airflow sensor is normal; when a high-level signal generated by the airflow sensor is received, view and judge whether the state flag indicates a normal state; if it indicates a normal state, respond to the triggering and control the electronic cigarette to operate; if it indicates an abnormal state, do not respond, which can shorten the time of sampling and comparison computation of the low-level signal duration, and eliminate the delay problem of signal and control. Specifically, the control method of the preferred embodiment includes the following steps:

S10a: setting a state flag configured for marking whether the airflow sensor is in a normal state or an abnormal state; of course, the content marked the state flag can be changed between the normal state and the abnormal state according to the detection of the level signal of the airflow sensor; for easing the operation of the program, when setting the state flag in S10a, an initial state of the state flag is marked as a normal state in the present embodiment.

S20a: detecting whether a high-level signal of the airflow sensor is received; if so, executing S301; if not, executing S401.

S30a: detecting whether the content marked by the state flag is a normal state; if so, executing S31a, controlling the electronic cigarette to operate; if not, not responding.

S40: measuring whether a duration of a low-level signal sent by the airflow sensor is greater than a preset threshold; if so, executing S41a, adjusting the content marked by the state flag to a normal state; if not, executing S42a, changing the state flag to mark an abnormal state.

When the steps in the present embodiment are employed, the triggering of the airflow sensor is marked and distinguished through the state flag; each time a high-level signal triggered by the airflow sensor is received, it is only needed to detect whether the current state marked by the state flag is a normal state, so as to output as fast as possible whether to respond. After each sampling and comparison of the low-level signal duration, the state flag will update the state according to a comparison result, thereby ensuring the accuracy of result.

Further, the computation result of the above state flag is stored in a flag register (PSW) according to the conventional selection of the controller and program design, and the result only needs to reflect two kinds of state information; preferably, a Zero Flag (ZF) commonly used in the program design is employed, that is, when the computation result is 0, ZF=1, otherwise, ZF=0. When applied to the above embodiment, ZF=0 indicates a normal state, and ZF=1 indicates an abnormal state; in the program design of S40, it is only needed to set and clear the ZF according to the judgment result. The execution of the program is simpler.

Of course, in the preferred embodiment, the preset threshold used for comparison in S40a is set to 200 ms or higher than 200 ms and lower than the smoking interval 1 s-4 s of a user, according to different time lengths of the low-level signals when the airflow sensor is triggered by a smoking action or leaking e-liquid.

In the above method embodiment, based on the requirement that an exact data of the state flag must be acquired each time the software is run, thus the initial mark content of the state flag must be set, for example, one of the above data states ZF=1 and ZF=0 must be the initial data state so as to be acquired and detected; therefore, the reset state of ZF=0 is set as the initial state in the above embodiment to indicate a normal state.

It is to be noted that in implementations the normal use of the product does not depend on whether the initial mark content is a normal state or an abnormal state. Specific application scenarios of an electronic cigarette are as follows.

If the electronic cigarette product is smoked immediately after it is turned on so that the airflow sensor is triggered, and the initial setting of the state flag is marked as a normal state, then the program runs normally. When the electronic cigarette product is properly stored without liquid leakage and the electronic cigarette is smoked so that the airflow sensor is triggered, the program run will also keep the state flag in a normal state through the judgment of S20 and S40a before smoking, and the program run will not be false triggered.

If the airflow sensor is triggered due to e-liquid leaking, the program controls the electronic cigarette to operate once in a normal state after the airflow sensor generates a high-level signal for about 100 ms for the first time, then in the first low-level signal process, the judgment enters S40a from S20a and the state is changed to abnormal, then, the electronic cigarette will not continue working under the condition of abnormal triggering. During the overall process, the electronic cigarette operates only once for a short time of about 100 ms, and in the subsequent process, the electronic cigarette will not be triggered to operate, until the leaking e-liquid on the airflow sensor is cleared. The program will run again after the electronic cigarette is restarted.

In another initial setting mode, if the initial flag content of the state flag is set to abnormal, the following will occur.

If the airflow sensor generates a high-level signal when triggered by a smoking action, the first inhaling action of the user will not trigger the electronic cigarette to operate; while the low-level signal lasts more than 200 ms after the first inhaling action ends, the flag content of the state flag is changed to a normal state according to the conditions in S20a to S40a, and then normal operation follows.

If the airflow sensor generates a high-level signal when triggered by a leaking e-liquid, the first high-level signal will not trigger the electronic cigarette to operate during the program run.

Among the above two initial setting modes of the state flag, the initial setting of normal state is employed preferably, in which the electronic cigarette can always match with the triggering action of smoking, while the triggering due to a leaking e-liquid only causes a short time of about 100 ms of operation, thus, the user experience is better compared with the initial setting of abnormal state.

The triggering state of the airflow sensor is marked by the state flag, and the content marked by the state flag is changed in time according to a received signal of the airflow sensor, for the controller to refer to when receiving a high-level signal in following process. In the above embodiments, the method in which the content marked by the state flag is adjusted according to the duration of the low-level signal can be replaced with a feature having the same effect. Specifically:

According to the signal waveform graphs shown in FIG. 1 and FIG. 2, the waveforms of the signals sent by the airflow sensor in normal and abnormal conditions have a significant difference in frequency and periodicity, for example, FIG. 1 shows a waveform signal of an airflow sensor manufactured from one factory triggered by a leaking e-liquid, with a periodicity of 158.4 ms and a low-level duration of about 54.4 ms, wherein the frequency of the high level and/or low level per unit time is apparently higher than that of the waveform signal triggered by normal smoking shown in FIG. 2. Therefore, the content of the above S40a can be replaced with:

S40b: measuring whether a duration of a high-level signal of the airflow sensor is greater than a preset threshold; if so, executing S41a, adjusting the content marked by the state flag to a normal state; if not, executing S42a, changing the state flag to mark an abnormal state Or S40c: detecting whether a frequency of low-level and/or high-level signals sent by the airflow sensor per unit time is greater than a preset threshold; if so, adjusting the state flag to mark an abnormal state; if not, adjusting the state flag to mark a normal state.

Of course, if the flag state is adjusted by detecting the frequency of low-level and/or high-level signals sent per unit time, the controller needs to collect the signals within this period of time during the implementation, which is longer in the sampling time compared with the method of sampling the duration of one low level or high level only. The result may be calculated after the end of sampling, which may not be as fast as the method of adjusting the state flag directly depending on the duration of low level or high level.

On the basis of the above method for controlling an electronic cigarette, the embodiment of the present disclosure further provides an electronic cigarette product configuring for executing the above method for controlling the electronic cigarette. The structure of the electronic cigarette product 100 can refer to FIG. 5, which includes a controller 110 and an airflow sensor 120; according to the above description, the structure of the airflow sensor 120 generally includes a sensing part 121, and a signal sampling output part 122 configured for sampling and outputting a signal change of the sensing part; the controller 110 includes a processing unit 111, which is configured for executing the method for controlling the electronic cigarette described above.

Figure 5:
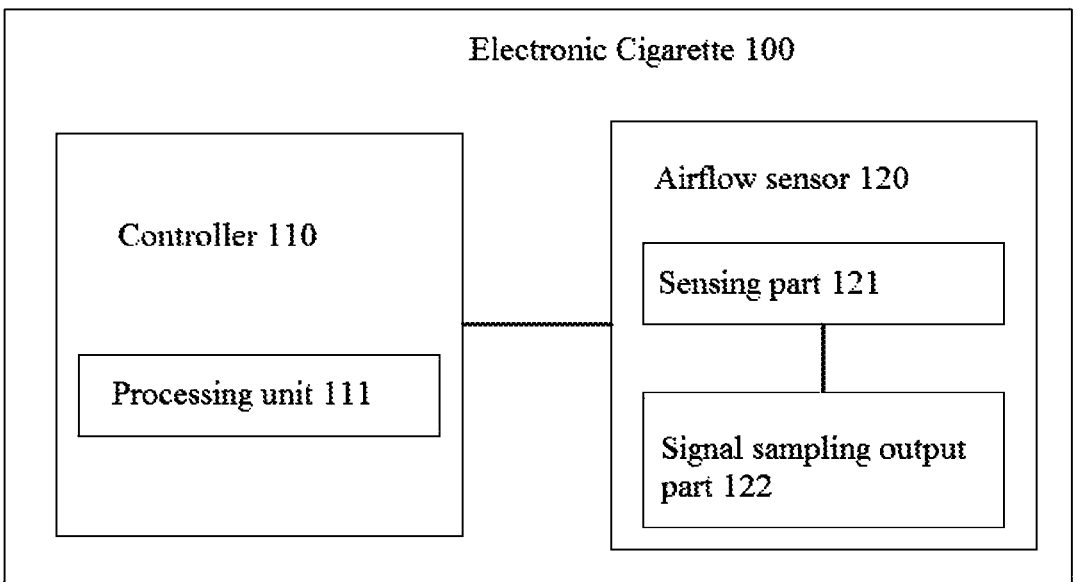
FIG. 5 is a structure diagram of an electronic cigarette.

The embodiment of the present disclosure further provides a nonvolatile computer readable storage medium, which stores computer executable instructions that, when executed by one or more processors, for example, one processing unit 111 shown in FIG. 5, can cause the processor to execute the method for controlling the electronic cigarette described in any method embodiment above.

The embodiment of the present disclosure further provides a computer program product, which includes a computer program stored on a nonvolatile computer readable storage medium, wherein the computer program includes program instructions which, when executed by the electronic cigarette, cause the electronic cigarette to execute any method for controlling the electronic cigarette described above.

The above device embodiments are merely for illustration. The unit described as a separate component may be or may not be physically separated; the component, displayed as a unit, may be or may not be a physical unit, that is, it may be located at one place, or may be distributed on a plurality of network units. Part or all modules may be selected to realize the purpose of the embodiment scheme according to actual needs.

Through the description of the above implementations, the ordinary skill in the art can clearly understand that each implementation can be achieved by means of software plus a common hardware platform, of course as well as through hardware. The ordinary skill in the art can understand that all or part of the processes in the above method embodiments may be implemented by instructing related hardware through a computer program which may be stored in a computer readable storage medium and which, when executed, may include, for example, the process of the embodiment of the above methods. The storage medium may be a disk, a compact disk, a Read-Only Memory (ROM) or Random Access Memory (RAM) and the like.

It is to be noted that the description and the accompanying drawings of the present disclosure illustrate some preferred embodiments of the present disclosure, but are not limited to the embodiments described in the description. Further, for the ordinary skill in the art, changes or transformations can be done according to the above description and all the changes and transformation are intended to be included in the scope of protection of claims appended herein.

What is claimed is:

1. A method for controlling an electronic cigarette, the electronic cigarette comprising an airflow sensor having a capacitance sensing part and a signal sampling output part, wherein the capacitance sensing part is configured to indicate a capacitance change due to a leaking e-liquid or a smoking airflow, and wherein the signal sampling output part is configured to collect the capacitance change, wherein, in response to a detected capacitance change at the capacitance sensing part within a sampling time, the airflow sensor is configured to output a high-level signal, and in response to no capacitance change being detected at the capacitance sensing part within the sampling time, the airflow sensor is configured to output a low-level signal in a time interval between the sampling, wherein the method comprises the following steps:

measuring a duration of a low-level signal output by the airflow sensor;

comparing the duration of the low-level signal to a preset threshold;

in response to the duration of the low-level signal being higher than the preset threshold and the airflow sensor outputting the high-level signal, outputting a control signal to control the electronic cigarette to operate; and in response to the duration of the low-level signal being lower than the preset threshold, determining that the airflow sensor is falsely triggered by a leaking e-liquid and in response to receiving the high-level signal output by the airflow sensor, not responding to the high-level signal.

2. The method for controlling the electronic cigarette according to claim 1, further comprising the following steps:

setting a state flag configured for marking whether the airflow sensor is in a normal state or an abnormal state;

when a high-level signal output by the airflow sensor is received, detecting whether the state flag marks a normal state; if the state flag marks a normal state, responding to the high-level signal so as to control the electronic cigarette to operate; if the state flag does not mark a normal state, not responding to the high-level signal.

3. The method for controlling the electronic cigarette according to claim 2, further comprising the following steps:

measuring whether a duration of a low-level signal output by the airflow sensor is greater than a preset threshold; if so, adjusting the state flag to mark a normal state; if not, adjusting the state flag to mark an abnormal state.

4. The method for controlling the electronic cigarette according to claim 3, wherein the electronic cigarette further comprises a controller having a flag register, and the state flag is stored in the flag register of the controller.

5. The method for controlling the electronic cigarette according to claim 3, wherein the airflow sensor outputs a first high-level signal and a second high-level signal that are adjacent; the duration of the low-level signal is a time interval between the first high-level signal and the second high-level signal.

6. The method for controlling the electronic cigarette according to claim 2, wherein the step of setting a state flag configured for marking whether the airflow sensor is in a normal state or an abnormal state comprises:

marking an initial state of the state flag as a normal state.

7. The method for controlling the electronic cigarette according to claim 6, wherein the electronic cigarette further comprises a controller having a flag register, and the state flag is stored in the flag register of the controller.

8. The method for controlling the electronic cigarette according to claim 6, wherein the airflow sensor outputs a first high-level signal and a second high-level signal that are adjacent; the duration of the low-level signal is a time interval between the first high-level signal and the second high-level signal.

9. The method for controlling the electronic cigarette according to claim 2, wherein the electronic cigarette further comprises a controller having a flag register, and the state flag is stored in the flag register of the controller.

10. The method for controlling the electronic cigarette according to claim 2, wherein the airflow sensor outputs a first high-level signal and a second high-level signal that are adjacent; the duration of the low-level signal is a time interval between the first high-level signal and the second high-level signal.

11. The method for controlling the electronic cigarette according to claim 1, wherein the airflow sensor outputs a first high-level signal and a second high-level signal that are adjacent; the duration of the low-level signal is a time interval between the first high-level signal and the second high-level signal.

12. The method for controlling the electronic cigarette according to claim 1, wherein the preset threshold is greater than or equal to 200 ms.

13. The method for controlling the electronic cigarette according to claim 1, wherein the preset threshold is less than 1 s.

14. An electronic cigarette, comprising an airflow sensor and a controller, wherein the airflow sensor has a capacitance sensing part and a signal sampling output part, wherein the capacitance sensing part is configured to indicate a capacitance change due to a leaking e-liquid or a smoking airflow, wherein the signal sampling output part is configured to collect the capacitance change, wherein, in response to a detected capacitance change at the capacitance sensing part within a sampling time, the airflow sensor is configured to output a high-level signal, and in response to no capacitance change being detected at the capacitance sensing part within the sampling time, the airflow sensor is configured to output a low-level signal, and wherein the controller comprises a processing unit, which is configured for executing the method for controlling the electronic cigarette according to claim 1.

* * * * *